(12) United States Patent
Patel et al.

(10) Patent No.: US 9,033,094 B2
(45) Date of Patent: May 19, 2015

(54) ENGINE MOUNT ASSEMBLY AND MOUNTING SYSTEM FOR A VEHICLE

(71) Applicant: CNH Industrial America LLC, New Holland, PA (US)

(72) Inventors: Dayalbhai R. Patel, Arlington Heights, IL (US); Thomas B. Tuttle, Naperville, IL (US); Suresh P. Pai, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 71 days.

(21) Appl. No.: 13/953,383

(22) Filed: Jul. 29, 2013

(65) Prior Publication Data

US 2015/0028180 A1 Jan. 29, 2015

Related U.S. Application Data

(62) Division of application No. 13/308,205, filed on Nov. 30, 2011, now Pat. No. 8,523,136.

(51) Int. Cl.
*B60K 1/00* (2006.01)
*B60K 5/12* (2006.01)
*F16F 1/36* (2006.01)

(52) U.S. Cl.
CPC .............. *B60K 5/1208* (2013.01); *F16F 1/36* (2013.01)

(58) Field of Classification Search
USPC .............. 248/634, 635, 544, 638, 674, 659; 267/141, 141.2, 140.11; 180/312, 291
See application file for complete search history.

(56) References Cited

U.S. PATENT DOCUMENTS

| | | | |
|---|---|---|---|
| 1,896,859 A | 2/1933 | Wylie |
| 2,241,026 A | 5/1941 | Wylie |
| 2,760,747 A | 8/1956 | Mordarski |
| 3,548,964 A | 12/1970 | Krauss |
| 3,613,815 A | 10/1971 | Meylink |
| 3,770,231 A | 11/1973 | Kirchgessner et al. |
| 3,883,099 A | 5/1975 | Hermann et al. |
| 3,883,100 A | 5/1975 | Hermann et al. |
| 4,007,924 A | 2/1977 | Jorn et al. |
| 4,067,524 A | 1/1978 | Brinkmann |
| 4,076,194 A | 2/1978 | Feucht et al. |
| 4,134,561 A | 1/1979 | Atkinson et al. |
| 4,625,939 A | 12/1986 | Bergelt |
| 5,003,684 A | 4/1991 | Inoue |
| 5,035,397 A | 7/1991 | Yamada |
| 5,052,530 A | 10/1991 | Shimazaki |
| 5,435,516 A | 7/1995 | Ogasawara et al. |
| 5,718,407 A | 2/1998 | Lee |

(Continued)

FOREIGN PATENT DOCUMENTS

JP 6200979 7/1994

*Primary Examiner* — Bradley Duckworth
(74) *Attorney, Agent, or Firm* — Sue C. Watson

(57) ABSTRACT

An engine mount assembly is provided for mounting an engine to a vehicle frame. The engine mount assembly includes an elastomeric material snubber element having a generally elongated configuration with axial end faces and a coaxial bolt passage defined therethrough. A tubular sleeve has an inner shape sized for sliding receipt of the snubber element therein. The tubular sleeve has a longitudinal cross-sectional profile such that a bottom longitudinal cross-sectional portion of the tubular sleeve extends axially beyond the end faces of the snubber element and defines an enlarged attachment footprint for the tubular sleeve to a vehicle frame flange.

4 Claims, 5 Drawing Sheets

(56) References Cited

U.S. PATENT DOCUMENTS

| | | |
|---|---|---|
| 5,915,727 A | 6/1999 | Bonnville |
| 6,145,821 A | 11/2000 | Suzuki et al. |
| 6,349,918 B1 | 2/2002 | Bunker |
| 6,374,939 B1 | 4/2002 | Hohnstadt et al. |
| 6,460,822 B1 | 10/2002 | Lee |
| 6,880,667 B2 | 4/2005 | Gotou |
| 7,370,871 B2 | 5/2008 | Cho |
| 7,416,244 B2 | 8/2008 | Polk et al. |
| 7,878,490 B2 | 2/2011 | Hartmann et al. |
| 7,887,248 B2 | 2/2011 | Heath |
| 8,042,793 B2 | 10/2011 | Igami |

ENGINE MOUNT ASSEMBLY AND MOUNTING SYSTEM FOR A VEHICLE

CROSS REFERENCE TO RELATED APPLICATIONS

The present application is a divisional application of U.S. patent application Ser. No. 13,308,205, filed Nov. 30, 2011, entitled "ENGINE MOUNT ASSEMBLY AND MOUNTING SYSTEM FOR A VEHICLE", which is hereby incorporated by reference herein in its entirety for all purposes.

FIELD OF THE INVENTION

The present invention relates generally to devices used to mount an engine to a frame in a vehicle, and more specifically to an engine mount that is particularly well-suited as a compact front mount for mounting a relatively heavy engine to a work vehicle frame.

BACKGROUND OF THE INVENTION

The use of various types of engine mounts is well-known for mounting engines to vehicle frames. These devices serve numerous purposes, including isolating frame movement and stresses from the engine, sound and vibration isolation, aligning the engine relative to the frame and drivetrain components, limiting movement of the engine relative to the frame, and so forth. Engine mounts are particularly important in larger, heavier work vehicles, such as tractors, farm vehicles, and so forth.

Examples of engine mounts for heavier work vehicles are described, for example, in U.S. Pat. No. 4,134,561; U.S. Pat. No. 4,076,194; U.S. Pat. No. 3,883,100; U.S. Pat. No. 3,770,231; and U.S. Pat. No. 4,067,524.

Particularly with larger work vehicles, conventional engine mounts can be quite substantial in their respective size and dimensions. Corresponding space and attachment points must be provided on the engine and vehicle frames to accommodate these mounts, which may add to the overall cost and weight of the frame components. In addition, assembly of the mounts can be tedious and time consuming, particularly if the mounts are assembled and attached from above within the relatively tight confines of the engine compartment.

The present invention provides an engine mount that is particularly suited for large work vehicles and addresses at least certain disadvantages over conventional engine mount designs.

BRIEF DESCRIPTION OF THE INVENTION

Aspects and advantages of the invention will be set forth in part in the following description, or may be obvious from the description, or may be learned through practice of the invention.

In accordance with aspects of the invention, an engine mount assembly is provided for mounting an engine to a vehicle frame. Although not limited to such use, the engine mount assembly is particularly well-suited for use in heavy work vehicles, such as a tractor, particularly as a front engine mount. The engine mount assembly includes an elongated (axial direction) elastomeric material snubber element with axial end faces. The snubber element may have any suitable cross-sectional shape, such as a cylindrical member, multi-sided member, and so forth. A bolt passage is defined through and along the longitudinal axis of the snubber element. A tubular sleeve is provided, which includes an inner shape or diameter sized for sliding receipt of the snubber element therein. The tubular sleeve has a cross-sectional profile in the longitudinal aspect such that a bottom longitudinal cross-sectional portion of the tubular sleeve extends axially beyond (past) the end faces of the snubber element. This bottom portion defines an enlarged attachment footprint for the tubular sleeve to a vehicle frame flange, with the footprint extending beyond the axial length of the snubber element while allowing the snubber element to be disposed between mounting arms of an engine frame.

In a particular embodiment, the tubular sleeve has an upper longitudinal cross-sectional portion that tapers from the bottom longitudinal cross-sectional portion towards the end faces of the snubber element. For example, the uppermost dimension of the upper longitudinal cross-sectional portion may be aligned with the end faces of the snubber element.

The engine mount assembly may be received between mounting arms of an engine frame and, in this particular embodiment, the snubber element may have an axial length so as to fit between the mounting arms. The upper longitudinal cross-sectional portion may have an axial length so as to also fit between the mounting arms, while the lower longitudinal cross-sectional portion has an axial length that extends axially beyond the mounting arms and defines the enlarged attachment footprint. In a particular embodiment, the tubular sleeve may have a generally trapezoidal longitudinal cross-sectional profile.

The tubular sleeve may include one or more windows or openings defined therein for any number of reasons. For example, a front window may be provided for fan belt clearance, and a back window may be provided to engage with a male alignment configured on the vehicle frame.

One or more attachment studs may be configured on the bottom longitudinal cross-sectional portion of the tubular sleeve at a location so as to extend through respective receiving holes in the vehicle frame flange. These attachment studs may be, for example, threaded or unthreaded studs that are engaged with mating nuts (e.g., threaded nuts or push-on spring nuts) on the opposite side of the vehicle frame flange, which may correspond to the underside of the vehicle frame.

In accordance with other aspects, the present invention also encompasses an engine mounting system. This system includes an engine frame having spaced-apart mounting arms provided at one or more mount positions. The mount position may be, for example, a front mount position. The system includes a vehicle frame to which the engine frame is mounted via the mount positions. The vehicle frame has a mounting flange proximate to the mount position. An engine mount assembly is provided at the mount position and is configured as described above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3b is a perspective view of a sleeve element for the engine mount of FIG. 3a;

FIG. 3c is a perspective view of a snubber element for the engine mount of FIG. 3a;

FIG. 3d is a perspective view of an alternative embodiment of a sleeve element for the engine mount of FIG. 3a;

FIG. 4b is a perspective view of a portion of a vehicle frame, particularly illustrating the mounting location for the engine mount assembly of FIG. 4a;

FIG. 5a is a perspective view of an engine and engine frame with an embodiment of an engine mount assembly;

FIG. 5b is a perspective view of a portion of a vehicle frame, particularly illustrating the mounting location for the engine mount assembly of FIG. 5a.

DETAILED DESCRIPTION OF THE INVENTION

Figure 1:
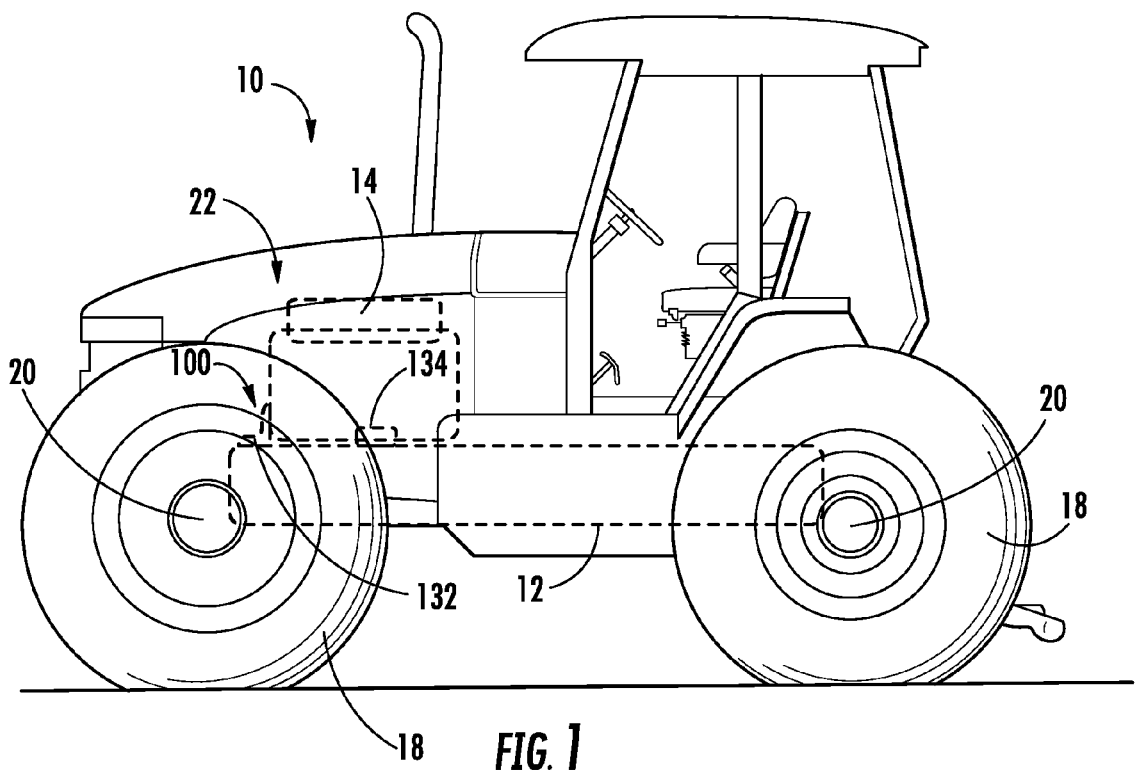
FIG. 1 is a view of a work vehicle, for example a tractor, utilizing an engine mount assembly in accordance with aspects of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a work vehicle 10 that may utilize any combination of engine mount assemblies 100 in accordance with aspects of the present invention for mounting an engine 14 to the vehicle frame 12. As is commonly understood by those skilled in the art, the engine 14 is mounted to a respective engine frame, which is in turn mounted to the vehicle frame 12 by engine mounts. The present invention relates to particular engine mount assemblies 100 that may be utilized as a side engine mount 134 or front engine mount 132. Various embodiments of the engine mount assembly described herein are particularly well suited as a front engine mount 132.

In FIG. 1, the work vehicle 10 is illustrated as a heavy work vehicle, such as a tractor or any other manner of heavy work vehicle, including various types of conventional agricultural/farm vehicles. The work vehicle 10 is supported by wheels 18 and respective axles 20 that are further supported by the vehicle frame 12. The engine 14 is located within the engine compartment 22 and, as mentioned, is mounted to a respective engine frame which, in turn, is mounted to the vehicle frame 12. It should be readily appreciated that the engine mount assemblies 100 in accordance with aspects of the invention are not limited to any particular type of work vehicle 10, and that the tractor illustrated in FIG. 1 is for illustrative purposes only.

An ongoing issue with the manufacture and construction of various types of work vehicles 10 is the assembly time and requirements for the drive train components, particularly assembly of the components (including the engine 14) to the vehicle frame 12. Mounting the engine/engine frame to the vehicle frame 12 from above and within the engine compartment 22 is particularly problematic.

Figure 2:
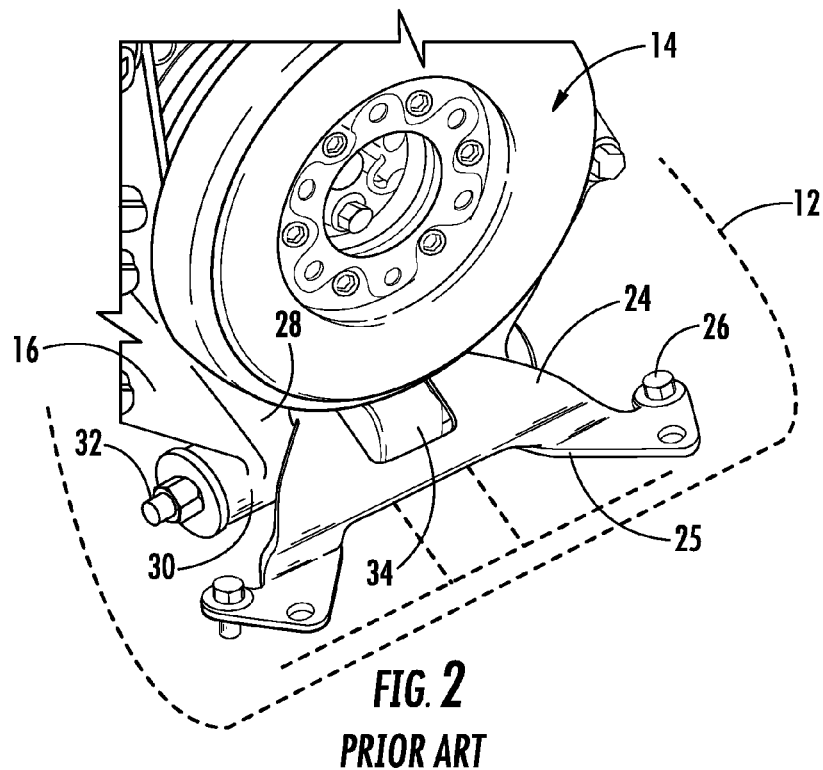
FIG. 2 is a perspective view of a prior art engine mount assembly.

FIG. 2 illustrates a conventional engine mount wherein the engine 14 is mounted to an engine frame 16, which is in turn mounted to the vehicle frame 12 (indicated by dashed lines) via a prior art engine mount. The engine mount includes a snubber 34 disposed between hubs 30 at the end of mount arms 28 formed with the engine frame 16. A fixing bolt 32 is coaxial with the snubber 34 and hubs 30 and attaches the snubber 34 to the hubs 30. A bracket 24 secures the snubber 34 relative to the vehicle frame 12. The bracket 24 has an upper component that extends between the mount arms 28 partially over the top of the snubber 34. The bracket 24 includes transverse extensions 25 that flare out from the snubber 34 and attach to the vehicle frame 12 via bolts 26. The type of mount assembly depicted in FIG. 2 is relatively difficult to assemble within the engine compartment 22 and requires a substantial mounting footprint on the vehicle frame 12.

Referring to FIGS. 3A through 3D, embodiments of an engine mount assembly 100 in accordance with aspects of the invention are illustrated. The engine mount assembly 100 is particularly suitable for a front engine mount 132 (FIG. 1), but may also be utilized at any other mount location, such as a side mount 134, for mounting an engine 14/engine frame 16 to a vehicle frame 12 (FIG. 1). The engine mount assembly 100 includes an elastomeric material snubber element 102, which may be the same type of conventional prior art snubber 34 depicted in FIG. 2. In general, the snubber element 102 is formed from any manner of natural or synthetic elastomeric material, such as a rubber or rubber-like material. In the illustrated embodiment, the snubber element 102 has a generally cylindrical configuration with axial end faces 110. It should be appreciated that the snubber element 102 may have any manner of cross-sectional shape other than cylindrical. For example, the snubber element 102 may have a multi-sided shape, such as a rectangular or square shape. A bolt passage 104 is defined along the longitudinal axis of the snubber element 102 (FIG. 3C), and may be defined by a pipe 105 or other suitable structural member provided in the snubber element 102. The elastomeric material of the snubber element 102 may be formed around the pipe 105. The snubber element 102 includes an outer circumferential surface 106, which may include a relief 108 defined therein.

Figure 3A:
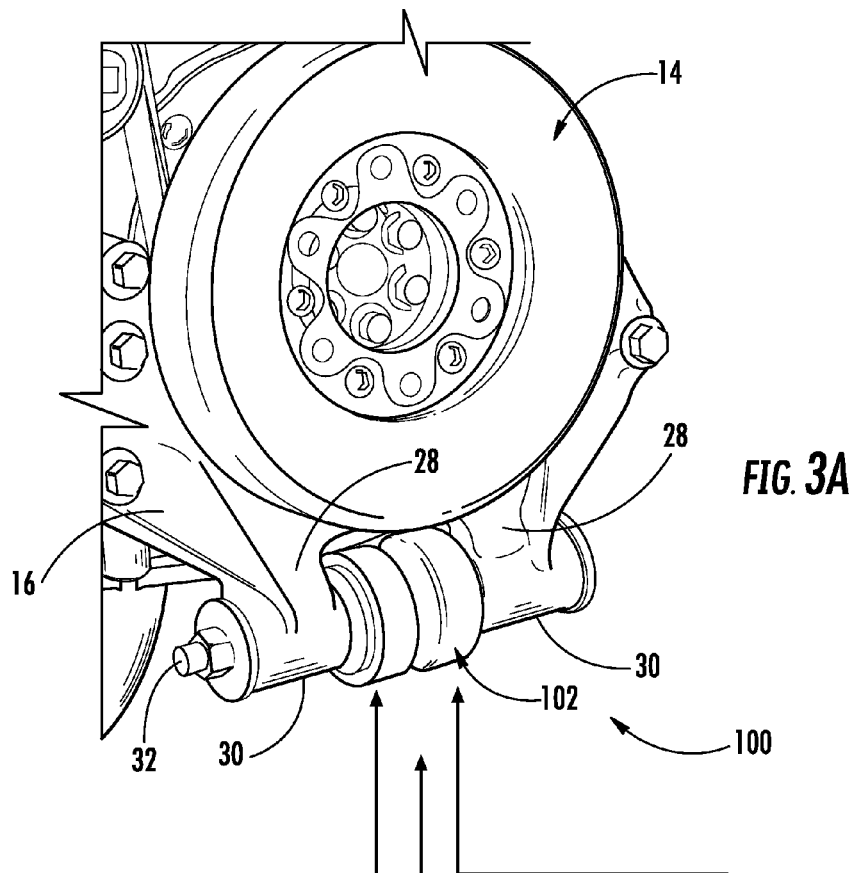
FIG. 3a is a perspective view of a front engine mount with a partial engine mount assembly.
Figure 3B:
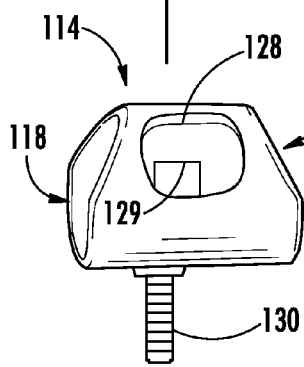
Figure 3C:
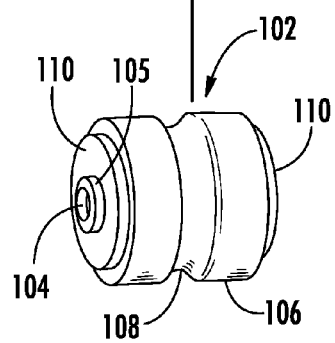
Figure 3D:
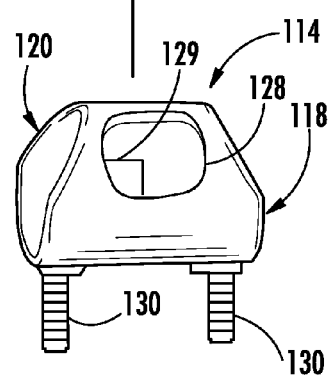

Referring to FIG. 3A, the snubber element 102 is received between the hubs 30 configured on the mounting arm components 28 of the engine frame 16. In particular, the snubber element 102 is axially aligned with the hubs 30 such that a fixing bolt 32 disposed through the hubs 30 and bolt passage 104 secures the snubber element 102 in the space between the hubs 30, as depicted in FIG. 3A.

Figure 4A:
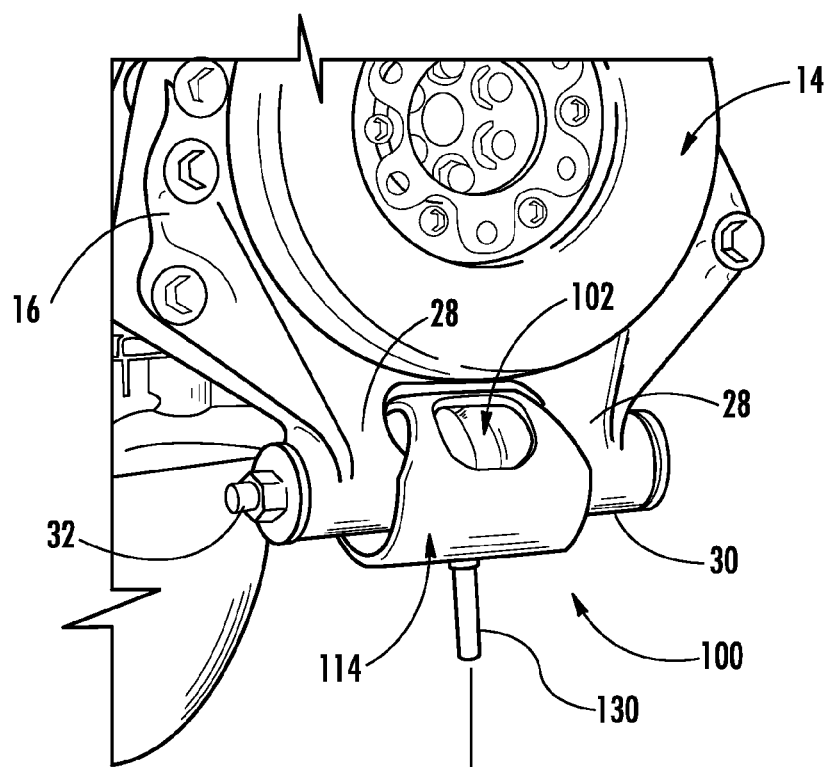
FIG. 4a is a perspective view of an engine and engine frame with an embodiment of an engine mount assembly.
Figures 5A, 5B:
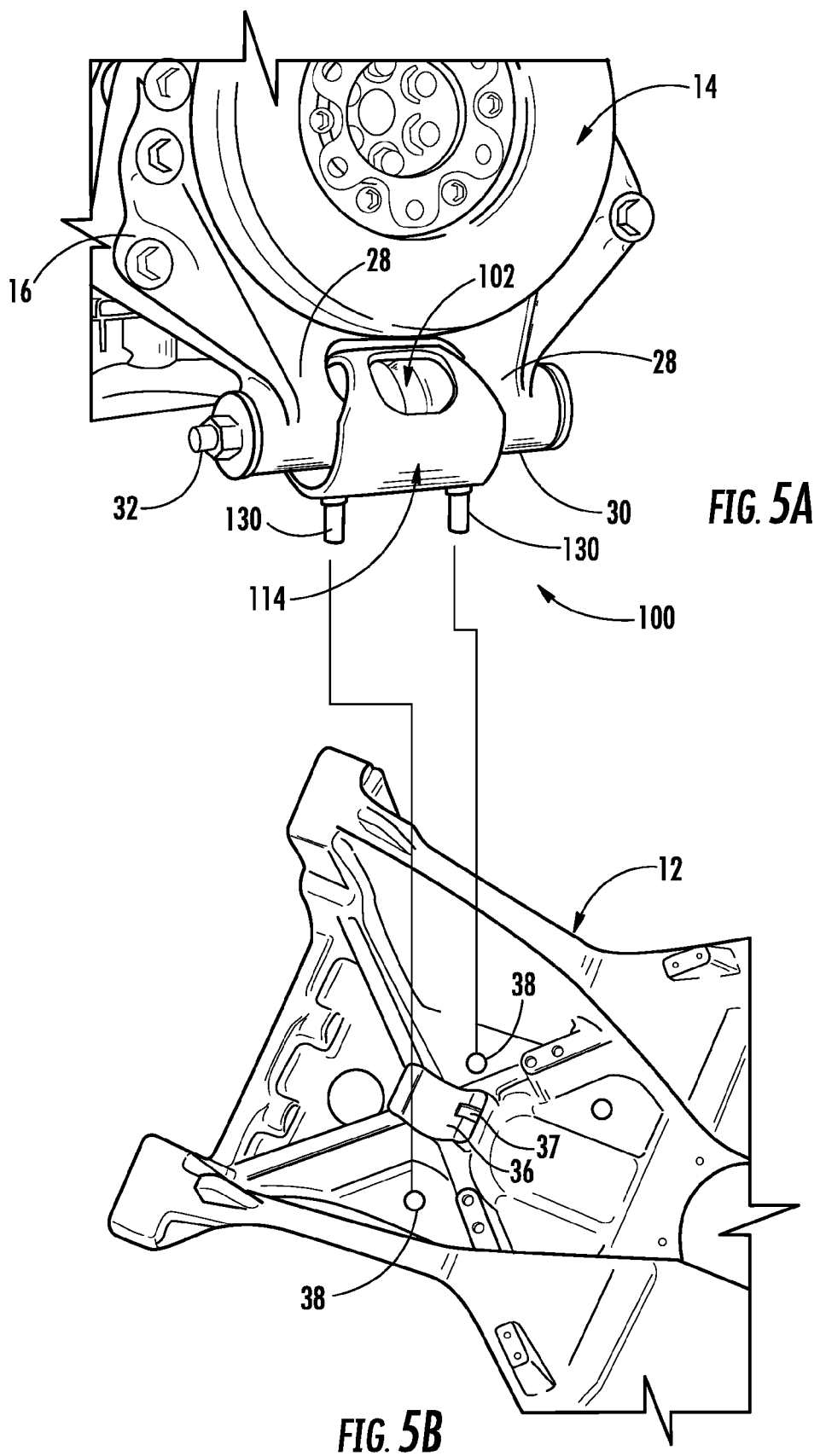

A tubular sleeve element 114 (FIGS. 3B and 3D) is provided and has an inner shape sized for sliding receipt of the snubber element 102 therein. For example, as illustrated in FIGS. 4A and 5A, the tubular sleeve element 114 may be cylindrical with an inner diameter sized for receipt of the cylindrical snubber element 102. In other embodiments, the tubular sleeve element 114 may be multi-sided with an inner shape sized for receipt of a multi-sided snubber element 102 therein. It should be appreciated that the tubular sleeve element 114 is a separate component from the snubber element 102 and the snubber element 102 is slid into the tubular sleeve 114 during assembly of the engine mount assembly 100, wherein the tubular sleeve element 114 and snubber element 102 contained therein are fitted between the post 30 in the orientation depicted in FIGS. 4A and 5A.

Figure 6:
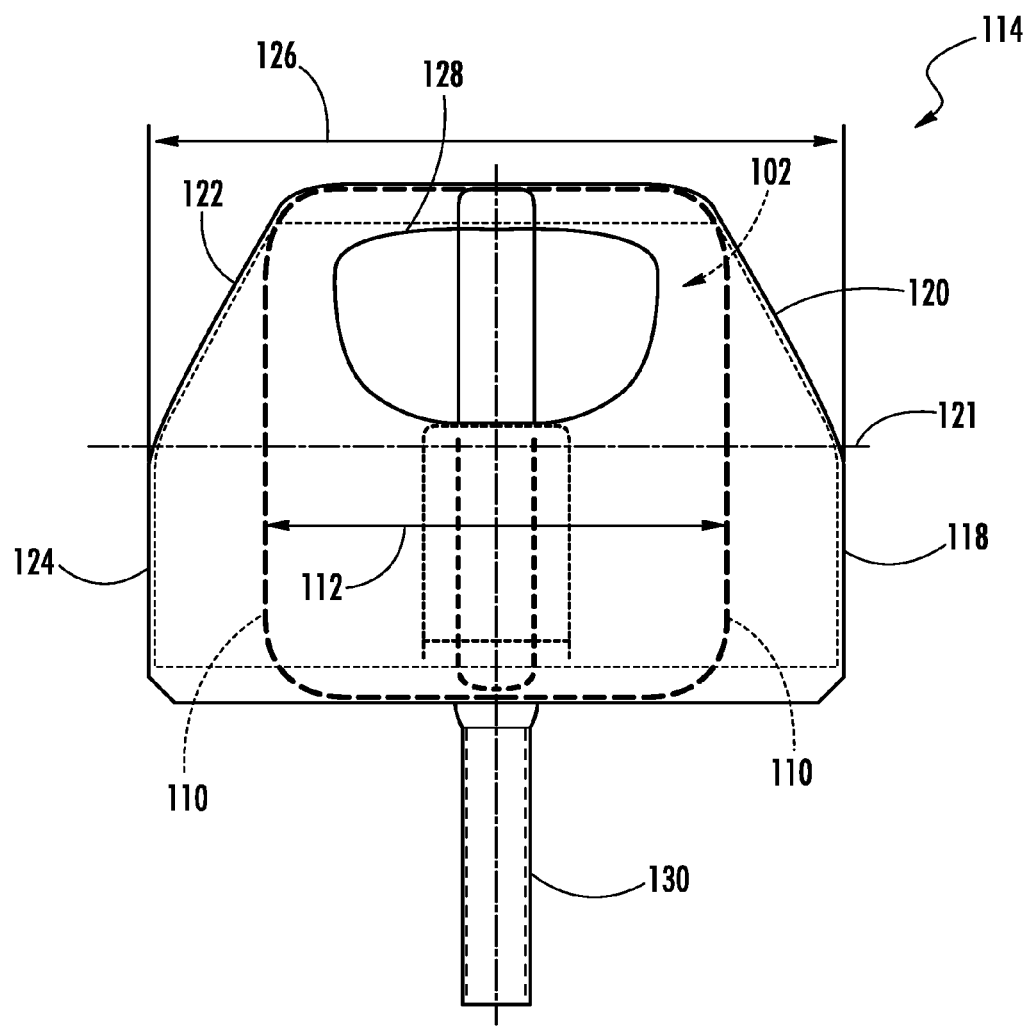
FIG. 6 is a side view of an embodiment of a tubular sleeve element component of an engine mount assembly.

Referring to FIG. 6, the tubular sleeve element has a longitudinal cross-sectional profile defined between the longitudinal ends thereof. This cross-sectional profile is defined such that a bottom portion 118 of the longitudinal cross-sectional profile extends axially beyond the end faces 110 of the snubber element 102, which has an axial length 112, as depicted in FIG. 6. The "bottom" portion 118 of the longitudinal cross-sectional profile may be defined relative to a midpoint reference line 121 corresponding to the longitudinal axis of the tubular element 114. In other embodiments, the bottom portion 118 may be defined relative to a line that lies above or below (vertically) the axis of the tubular element 114.

Figure 4B:
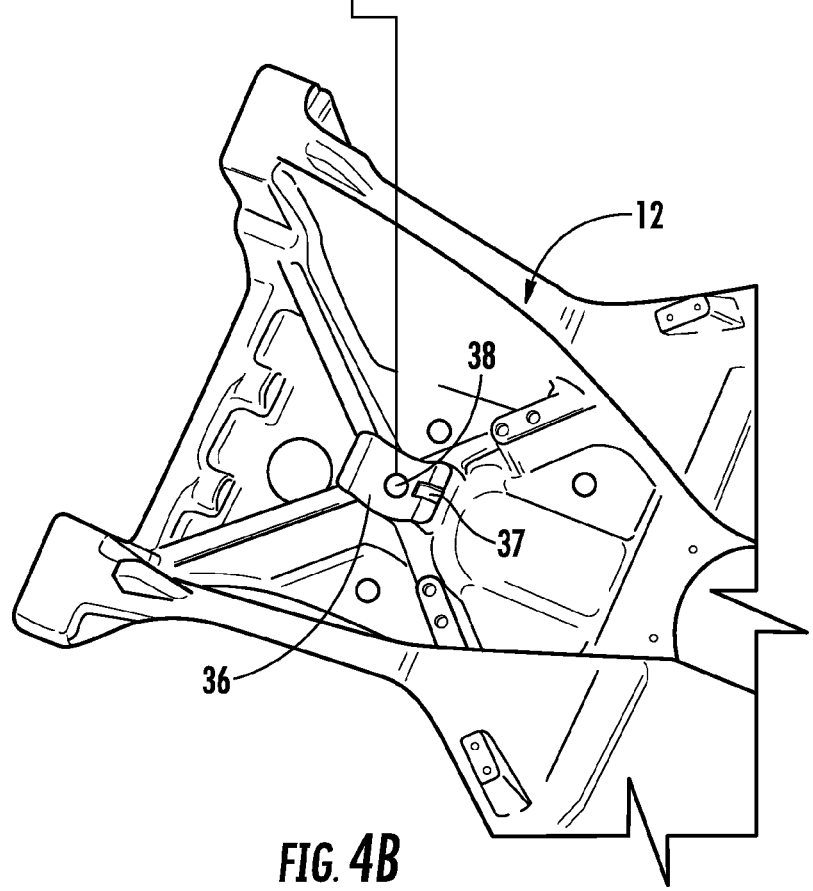

Still referring to FIG. 6, the bottom portion 118 of the tubular element 114 defines an attachment footprint of the tubular element 114 that is received by a corresponding flange 36 defined in the vehicle frame 12, as depicted in FIGS. 4B and 5B. It should thus be appreciated that the contact surface area between the bottom portion 118 of the tubular sleeve 114 and the vehicle frame flange 36 is enlarged relative to the axial length 112 of the snubber element 102 yet is coaxial with the snubber element 102, as depicted in FIG. 6. Thus, this enlarged, coaxial attachment footprint does not extend outwardly or transversely from the mount location, as compared to the prior art construction of FIG. 2, and thus requires relatively minimal footprint space on the vehicle frame 12.

Again referring to FIG. 6, the tubular sleeve 114 may also comprise an upper longitudinal cross-sectional portion 120 that tapers towards the axial end faces of the snubber element 102. In the embodiment depicted in the figures, the upper portion 120 tapers to the axial end faces 110 of the snubber element 102, but in other embodiments need not taper completely to the end faces 110.

In the depicted embodiments, the bottom longitudinal cross-sectional portion 118 of the tubular element 114 is defined by generally vertical side walls 124, while the tapered upper portion 120 is defined by uniformly tapered end walls 122, for example in a trapezoidal cross-sectional shape as depicted in the figures. Other varying cross-sectional profiles are also envisioned.

As depicted in FIGS. 4A and 5A, the upper longitudinal cross-sectional portion 120 of the tubular sleeve has an axial length so as to completely encircle the snubber element 102 within the space defined between the mounting arms 28 of the engine frame 16. At the same time, the lower longitudinal cross-sectional portion 118 has an axial length 126 (FIG. 6) so as to extend beyond the snubber element 102 and at least partially encircle the mounting hubs 30, thereby providing the increased mounting footprint without extending outwardly or transversely away from the hubs 30 or engine frame 16.

Referring to the figures in general, the tubular sleeve 114 may contain any configuration of openings or windows 128 for various reasons. For example, a window 128 may be defined in front face of the tubular sleeve 114 to accommodate a fan belt, or any other component of the engine. A window 129 may be defined in a rear face of the tubular sleeve 114 to mate with a male alignment member 37 (FIGS. 4B and 5B) provided on the vehicle frame 12.

In the embodiment of FIGS. 4A and 4B, the tubular sleeve 114 includes a single attachment stud 130, which may be a threaded or unthreaded bolt member that is welded onto the outer circumferential surface of the tubular element 114. This attachment stud 130 is received through a hole 38 in the mounting flange 36. To secure the engine mount assembly 100 relative to the vehicle frame 12, a nut (e.g., a threaded nut or push-on spring nut) is tightened onto the stud 130 from below the vehicle frame 12. Thus, final attachment of the assembly 110 is achieved from below the vehicle frame 12, which greatly facilitates the assembly process.

In the embodiment of FIGS. 5A and 5B, a pair of the attachment studs 130 are provided on the tubular sleeve 114. These bolts 130 are received through the holes 38 provided on opposite sides of the mounting flange 36, as depicted in FIG. 5B. As discussed above, the pair of attachment studs 130 are secured to the frame 12 from below the frame.

As depicted in FIGS. 4B and 5B, the mounting flange 36 defines a seat for the tubular sleeve 114 and may include any manner of alignment member 37, such as a ridge or other type of protrusion, that engages in the window 129 defined in the rear face of the tubular sleeve 114. Engagement of the window 129 and alignment member 37 ensures proper placement and location of the assembly 100 relative to the vehicle frame 12.

It should be appreciated that the snubber element 102 may be variously configured within the scope and spirit of the invention. In the illustrated embodiments, the snubber element 102 is a generally solid elastomeric material between the bolt passage 104 and the outer circumferential surface 106. The component is "solid" in that it does not contain internal cavities, voids, and the like. In alternate embodiments, however, the snubber element 102 may include internal cavities, and so forth.

The present invention also encompasses a complete engine mounting system that incorporates an engine mount assembly 100 in accordance with aspects of the invention. The engine mount system thus includes any component of an engine frame having spaced-apart mounting arms 28 at a mount position 132 (FIG. 1). The mounting system also includes a vehicle frame 12 having a mounting flange 36 proximate to the mount position, as discussed above with respect to FIGS. 4B and 5B. An embodiment of an engine mounting system also utilizes any manner of engine mount assembly 100 for mounting the engine frame 16 to the vehicle frame 12, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine mounting system, comprising:
   an engine frame, said engine frame further comprising spaced-apart mounting arms at a mount position;
   a vehicle frame, said vehicle frame comprising a mounting flange proximate to said mount position; and
   an engine mount assembly at said mount position, said engine mount assembly further comprising:
   an elastomeric material snubber element, said snubber element comprising a generally elongated configuration with axial end faces and a bolt passage defined therethrough coaxial with a longitudinal axis of said snubber element; and
   a tubular sleeve having an inner shape sized for sliding receipt of said snubber element therein,
   said tubular sleeve comprising a longitudinal cross-sectional profile such that a bottom longitudinal cross-sectional portion of said tubular sleeve extends axially beyond said end faces of said snubber element and defines an enlarged attachment footprint for attaching said tubular sleeve to said mounting flange on said vehicle frame, wherein said tubular sleeve comprises an upper longitudinal cross-sectional portion that tapers from said bottom longitudinal cross-sectional portion towards said end faces of said snubber element, and wherein said snubber element has an axial length so as to fit between said mounting arms, said upper longitudinal cross-sectional portion having an axial length so as to also fit between said mounting arms, said lower longitudinal cross-sectional portion having an axial length that extends axially beyond said mounting arms.

2. The engine mounting system as in claim 1, wherein said tubular sleeve comprises a generally trapezoidal longitudinal cross-sectional profile.

3. The engine mounting system as in claim 1, wherein said mounting flange defines a seat for receipt of said tubular sleeve, said seat comprising an alignment member configured thereon, and said tubular sleeve comprising a window in a rear face thereof at a location so as to engage with said alignment feature.

4. The engine mounting system as in claim 1, further comprising at least one attachment stud configured on said bottom longitudinal cross-sectional portion at a location so as to extend through a receiving hole in said vehicle frame flange.

* * * * *